Patented July 14, 1942

2,289,781

UNITED STATES PATENT OFFICE 2,289,781

PRESERVATION OF NATURAL OIL BEARING PRODUCTS DURING PROCESSING TO REMOVE OIL THEREFROM

Kenneth C. D. Hickman, Rochester, N. Y., assignor to Distillation Products, Inc., Rochester, N. Y., a corporation of Delaware No Drawing. Application October 11, 1939, Serial No. 298,967

8 Claims. (Cl. 260—412)

This invention relates to an improved procedure for removing vegetable and animal oils from vegetable and animal tissue, carcasses, etc.

There are a large number of methods for removing oils from vegetable and animal matter. They can in general be divided into three classes involving pressing, solvent extraction and chemical digestion. Combinations of one or more of these procedures and heating, steaming, etc. are customary. In spite of the observance of cleanliness in this industry the oils extracted from vegetable and animal matter are in many cases of such poor quality as regards odor, taste, color, etc. that they are classed as second and third grade oils and command a corresponding low price. In many cases the oils are of such poor quality that they are unsatisfactory for human consumption and their use is restricted to animal feeds and industrial purposes.

This invention has for its object to provide an improved method for extracting oils from animal and vegetable matter. Another object is to provide a process for removing oils, fats and the like from vegetable and animal matter which will yield oils having improved qualities as regards odors, taste or color etc. Another object is to provide a process for extracting oils or rendering from vegetable and animal matter which will substantially avoid deterioration of the oil during the processing treatment. Other objects will become apparent from the following description.

These and other objects are accomplished in accordance with my invention which includes processing the vegetable or animal matter to remove the oils therefrom while in intimate association with a substance which actively absorbs oxygen from the atmosphere.

My invention thus differs from other inventions designed to prevent oxidation of perishable materials. It has been common practice to preserve the raw materials with antioxidants, bacterial poisons, antiseptics, etc., and it is also well-known to take similar precautions and make similar additions to the finished oil. It has not heretofore been the practice to apply protective agents, and particularly active oxygen absorbing agents, at the time of comminution, extraction, and processing, yet it is at this very time that the materials are subjected to the greatest stress of manipulation, cleavage, aeration, and other chemical and mechanical alteration.

In the following description I have set forth several of the preferred embodiments of my invention but it is to be understood that they are given for the purpose of illustration and not in limitation thereof.

The procedure common to almost all methods of removing oils from vegetable and animal matter involves comminution, pulping, crushing or the like in order to divide the material and thus increase the ease with which the oil can be removed. It is during this procedure that the active oxygen absorber is present or is added in accordance with my invention. These active absorbers are materials which in the solid or liquid state or in solution remove or absorb oxygen, providing a substantially oxygen free solution. They should not be confused with antioxidants which are designed to repress oxidation without removing the dissolved oxygen. I contemplate using reducing agents of a class that reduce the oxygen concentration of the pulped materials and in certain cases actually reduce back to their original condition, or to an improved state of reduction, constituents of the pulped vegetable or animal material which for one reason or another have already become oxidized. While I consider particularly as included in my invention the use of such active oxygen absorbers, I do not exclude the use of true antioxidants in conjunction with the oxygen absorbers to delay or control the reaction with oxygen, albeit I do not consider within my invention the incorporation of traces of antioxidant without the presence of larger quantities of the active oxygen absorbers.

The oxygen absorber can be added to the organic material immediately prior to the comminution and extraction procedure, or it may be added during the procedure. It can be added to the vegetable or animal matter in the solid form, in which case it will be thoroughly intermingled during comminution and will be largely dissolved in the natural water contained therein. Solutions of the active oxygen absorbers may be added instead of solids. It is desirable that these materials be added just before the first stage of the processing treatment so that they will be available and exert their protective action during the entire period that the material is being treated to remove the oil therefrom. In the case such comminution is not the first stage in the processing treatment the active oxygen absorber is preferably added at the first stage of the process whatever its nature may be.

Examples of active oxygen absorbers are sulfites and bisulfites such as sodium sulfite, sodium and potassium bisulfites, hydrosulfites, sulfurous acid phosphates and hypophosphites, in fact all common salts, acids or compounds of sulfur or phosphorus in a reduced state of oxidation. Also included are hydrazine, hydroxylamine, ferrous, titanous, cerous, manganous, salts and other salts of reduced valency. The hydrogen ion concentration may be raised by addition of alkali or lowered by addition of acids. Bisulfites and buffered solutions of the active oxygen absorbers such as a sodium bisulfite-sulfite mixture or solution may be employed. Ammonium sulfites or organic sulfites such as diethyl sulfite and amyl sulfite are recommended when volatility is required, for instance, to remove the active oxygen absorbers from the press cake after expression of the oil therefrom. In combination with active oxygen absorbers, I contemplate using well known organic antioxidants, such as hydroquinone, pyrogallic acid, diphenyl amine, triethanol amine, etc., and substitution products thereof. The addition of such reducing agents may be desirable in many cases but they are not necessary and my invention is not restricted to their use.

My invention can be employed in connection with the removal of oils, fats, etc., regardless of what the particular method of removal might be. I contemplate protecting the vegetable or animal matter and the oil contained therein during processing by solvent extraction methods whether dry or wet, hot or cold, by pressing methods whether hot or cold, dry or wet and by methods which involve chemical digestion. Processing methods which involve combinations of the foregoing are also common in the art. One such method involves comminution, alkali digestion and the expression by screw press or centrifuges. It is to be understood that my invention is applicable to all such methods.

It will be apparent that my improved procedure is applicable to the removal of oils, fats, or the like, from vegetable or animal matter. Among the materials which can be treated to remove oils in accordance with my invention are cod and tuna livers and bodies, eggs to remove egg fat, fruit to remove fruit flesh oils, sheep tissue to remove tallow, slaughter house products and refuse to produce lard and soap oils, whale and fish body, such as menhaden to remove body oils, mollusk flesh, flax seed, olives, cotton seed, peanuts and oiticica seed to remove respectively linseed, olive, cotton seed, peanut and oiticica oils.

Various theories have been advanced regarding the cause of the undesirable qualities of oils removed from vegetable and animal matter. Bacterial action, hydrolysis, action of ferments, etc. have all been advanced as causes and undoubtedly have a substantial effect on the character of the oil. However, most of these substances require a prolonged period of time to act and their harmful action during the relatively short period of processing is quite negligible. I have found that one of the main causes of the poor quality of oils is that the atmospheric oxygen is rapidly taken up by the vegetable and animal matter and causes development of odors, or other undesirable products during the actual processing. That oxygen has a decided action is apparent when one considers the fact that during the processing the vegetable or animal matter is openly exposed to the atmosphere which in many cases is introduced in large amount into the processed material by splashing, stirring, steaming, etc. Carrying the processing treatment out in an inert atmosphere in order to exclude the action of oxygen is, of course, impractical. When processing in accordance with my invention the active oxygen absorbers quickly combine with all the oxygen which is introduced into the animal matter or oil or which is occluded therein. As a result, a vastly improved oil of high commercial value is obtained.

Example 1

One thousand pounds of tuna livers were macerated with 50 pounds of sodium sulfite, and the mass was gradually raised to a temperature of 160° F. 75 pounds of sodium hydroxide were added and the mixture kept at 160° for 40 minutes. During this time the mass remained a dull pink in color, showing that oxidation of the liver blood pigments had been substantially prevented. The slurry was then passed through a centrifuge and 75 pounds of oil were removed, having a potency of 95,000 U. S. P. units per gram. The slurry was returned to the refining kettle and was extracted with 100 pounds of crude sesame oil and was again centrifuged. A final extraction with 100 pounds of sardine oil was employed to remove the remaining vitamin A.

A companion experiment was performed without the use of sulfite. The slurry turned black owing to oxidation but the yield of oil was substantially the same in the three stages of the process; the yield of vitamin A was lower, the potency for the first extraction being only 82,000 units per gram. The first, second, and third runs of oil were darker in color and more objectionable in odor than in the case of the sulfite extracted material.

Example 2

1000 pounds of halibut livers were macerated with 25 pounds of sodium sulfite and two pounds of pyrogallic acid. 35 pounds of sodium hydroxide were added, and the mixture was brought to 150° C. for 30 minutes. The oil was washed with ten times its bulk of warm water with agitation and again separated by centrifugal force.

In a companion experiment without the use of sulfite and pyrogallic acid, a lesser yield of lower quality oil resulted.

Example 3

1000 pounds of swordfish livers were macerated with 20 pounds of sodium hypophosphite and 10 pounds of manganous sulfate. 30 pounds of caustic potash were added, and the mixture was brought to a temperature of 165° for one hour. The oil was separated by centrifugal means. It was found to be exceptionally light in color. The precipitate of manganese basic oxide-phosphate produced during the reaction had absorbed considerable quantities of the organic coloring matters associated with the livers.

Example 4

Rejected sardines from canning operations were admitted to a rendering machine of conventional pattern in which the sardines are passed on conveyers through troughs supplied with live steam. Prior to entering the troughs, the sardines were sprinkled with powdered anhydrous sodium sulfite in proportion of 1 part by weight to two parts of sardines. After passage through the machine, oil was extracted by pressure. Both the oil and the resulting meal were found to be lighter in color and freer from odor than oil extracted in a companion run on substantially the same batch of sardines without the use of sodium sulfite. The vitamin A content of sulfite-treated oil was substantially improved through little increase in vitamin D was noted.

*Example 5*

10,000 pounds of cottonseed were feed into an Anderson expeller with 100 pounds of a blend consisting of 80 pounds of sodium sulfite and 20 pounds of sodium bi-sulfite in intimate admixture. In a companion experiment a similar batch of cottonseed oil was passed through the expeller without the addition of the sulfite-bisulfite mixture. The color of the oil was lighter where the sulfite mixture was employed; the content to tocopherol was substantially greater, and the resistance to rancidity was improved.

*Example 6*

10,000 pounds of soybeans were ground with 100 pounds of ferrous sulfate and 100 pounds of trisodium phosphate. The macerated material was passed through a countercurrent extractor of conventional pattern and extracted, using light petroleum ether. The ether was removed by heating and later by partial vacuum. The oil was compared with oil resulting from a similar run without the addition of chemicals. The chemically treated oil was found to contain a higher proportion of vitamin K and the tocopherols. It was lighter in color and showed greater resistance to oxidation and rancidity.

While I prefer to have the active oxygen absorbers present during the entire processing treatment, it is evident that protection can be obtained by having them present during any part thereof. For instance, when heating or steaming procedure is used, this step causes a high rate of oxidation. It is therefore practical to have the active oxygen absorber present only during this stage, or if desired, during any particular step in the course of processing. Such partial use is to be understood as being within the scope and spirit of my invention.

What I claim:

1. In the process of treating substantially fresh or undecomposed vegetable or animal matter to remove oils therefrom, the step which comprises carrying out the entire processing steps for the removal of oil from the vegetable or animal matter in the presence of an amount of active oxygen absorber sufficient to remove substantially all oxygen and to maintain the vegetable or animal matter in a deoxygenated condition whereby oxygen of the air which comes into contact with the material treated during the processing treatment is prevented from causing harmful deterioration during the process.

2. In the process of treating substantially fresh or undecomposed vegetable or animal matter to remove oils or fats therefrom, the step which comprises carrying out at least part of the oil removal treatment in the presence of an amount of active oxygen absorber sufficient to remove substantially all oxygen and to maintain the vegetable or animal matter in a deoxygenated condition whereby oxygen of the air which comes into contact with the material treated during the processing treatment is prevented from causing harmful deterioration during the process.

3. In the process of treating substantially fresh or undecomposed vegetable or animal matter to remove oils or fats therefrom, the step which comprises carrying out at least part of the oil removal treatment in the presence of an amount of a buffered active oxygen absorber sufficient to remove substantially all oxygen and to maintain the vegetable or animal matter in a deoxygenated condition whereby oxygen of the air which comes into contact with the material treated during the processing treatment is prevented from causing harmful deterioration during the process.

4. In the process of treating substantially fresh or undecomposed vegetable or animal matter to remove oils or fats therefrom, the step which comprises carrying out at least part of the oil removal treatment in the presence of a mixed protecting agent comprising an active oxygen absorber and an antioxidant, the active oxygen absorber being present in sufficient amounts to remove substantially all oxygen and to maintain the vegetable or animal matter in a deoxygenated condition whereby oxygen of the air which comes into contact with the material treated during the processing treatment is prevented from causing harmful deterioration during the process.

5. In the process of removing oils or fats from substantially fresh or undecomposed vegetable or animal matter, the step which comprises carrying out at least part of the oil removal treatment in the presence of a sulfite, the sulfite being present in an amount sufficient to remove substantially all oxygen and to maintain the vegetable or animal matter in a deoxygenated condition whereby oxygen of the air which comes into contact with the material treated during the processing treatment is prevented from causing harmful deterioration during the process.

6. In the process of removing oils or fats from substantially fresh or undecomposed vegetable or animal matter, the step which comprises carrying out at least part of the oil removal treatment in the presence of amounts of alkali metal sulfite sufficient to remove substantially all oxygen and to maintain the vegetable or animal matter in a deoxygenated condition whereby oxygen of the air which comes into contact with the material treated during the processing treatment is prevented from causing harmful deterioration during the process.

7. In the process of removing oils or fats from substantially fresh or undecomposed vegetable or animal matter, the step which comprises carrying out at least part of the oil removal treatment in the presence of sodium sulfite, the sodium sulfite being present in an amount sufficient to remove substantially all oxygen and to maintain the vegetable or animal matter in a deoxygenated condition whereby oxygen of the air which comes into contact with the material treated during the processing treatment is prevented from causing harmful deterioration during the process.

8. In the process of removing oils or fats from substantially fresh or undecomposed vegetable or animal matter, the step which comprises carrying out at least part of the oil removal treatment in the presence of sodium sulfite and an antioxidant, the sodium sulfite being present in an amount sufficient to remove substantially all oxygen and to maintain the vegetable or animal matter in a deoxygenated condition whereby oxygen of the air which comes into contact with the material treated during the processing treatment is prevented from causing harmful deterioration during the process.

KENNETH C. D. HICKMAN.